(12) United States Patent
Rockwood

(10) Patent No.: US 9,855,993 B2
(45) Date of Patent: Jan. 2, 2018

(54) VARIABLE DIAMETER PULLEY ASSEMBLY AND CONTINUOUSLY VARIABLE TRANSMISSION USING THE SAME

(71) Applicant: David Conrad Rockwood, Honolulu, HI (US)

(72) Inventor: David Conrad Rockwood, Honolulu, HI (US)

( * ) Notice: Subject to any disclaimer, the term of this patent is extended or adjusted under 35 U.S.C. 154(b) by 167 days.

(21) Appl. No.: 14/147,616

(22) Filed: Jan. 6, 2014

(65) Prior Publication Data

US 2015/0251725 A1    Sep. 10, 2015

(51) Int. Cl.
*B62M 9/08*    (2006.01)
*F16H 9/24*    (2006.01)

(52) U.S. Cl.
CPC ............... *B62M 9/08* (2013.01); *F16H 9/24* (2013.01)

(58) Field of Classification Search
CPC ............... F16H 9/10; F16H 9/24; B62M 9/08
USPC ................... 74/244; 474/56, 29, 49
See application file for complete search history.

(56) References Cited

U.S. PATENT DOCUMENTS

| | | | | |
|---|---|---|---|---|
| 3,956,944 A | * | 5/1976 | Tompkins | F16H 55/54 474/50 |
| 3,995,508 A | * | 12/1976 | Newell | F16H 35/02 474/50 |
| 4,129,044 A | * | 12/1978 | Erickson | B62M 9/08 280/236 |
| 4,516,960 A | * | 5/1985 | Rathert | F16H 55/54 474/47 |
| 4,741,546 A | * | 5/1988 | Reswick | F16H 55/54 280/236 |
| 4,768,996 A | * | 9/1988 | Kumm | F16H 55/54 474/49 |
| 4,810,235 A | * | 3/1989 | Husted | B62M 9/08 474/49 |
| 4,938,732 A | * | 7/1990 | Krude | F02B 67/06 474/53 |
| 4,946,426 A | * | 8/1990 | Leonard | B62M 9/08 474/101 |
| 4,973,289 A | * | 11/1990 | Leonard | B62M 9/08 474/136 |
| 5,011,458 A | * | 4/1991 | Kumm | F16H 9/10 474/49 |

(Continued)

*Primary Examiner* — William E Dondero
*Assistant Examiner* — Mark K Buse

(57) ABSTRACT

Provided is a continuously variable transmission including a variable diameter first pulley assembly, a second pulley assembly, coupled with an endless power transfer element. The first pulley assembly includes: a first side member having a plurality of first guideways coupled to rotate on a first axle; a second side member having a plurality of a second guideways, separated from the first side member, coupled to rotate freely about the first axle; a plurality of pulley segments engaged with the endless power transfer element coupled with the first and second guideways arranged in the circle about the first axis of rotation; an actuator for rotating the first and second side member relative to each other about the first axis of rotation, producing radial displacement of the pulley segments and changing the effective diameter of the first pulley assembly; and a tensioner for tensioning the endless power transfer element.

31 Claims, 8 Drawing Sheets

(56) References Cited

U.S. PATENT DOCUMENTS

| | | | | |
|---|---|---|---|---|
| 5,476,422 A | * | 12/1995 | Schendel | F16H 55/54 |
| | | | | 474/49 |
| 9,175,755 B2 | * | 11/2015 | Clopet | F16H 9/10 |
| 2007/0243969 A1 | * | 10/2007 | Siman-Tov | F16H 9/24 |
| | | | | 476/5 |
| 2010/0016108 A1 | * | 1/2010 | Siman-Tov | F16H 55/56 |
| | | | | 474/176 |

\* cited by examiner

[FIG. 1]
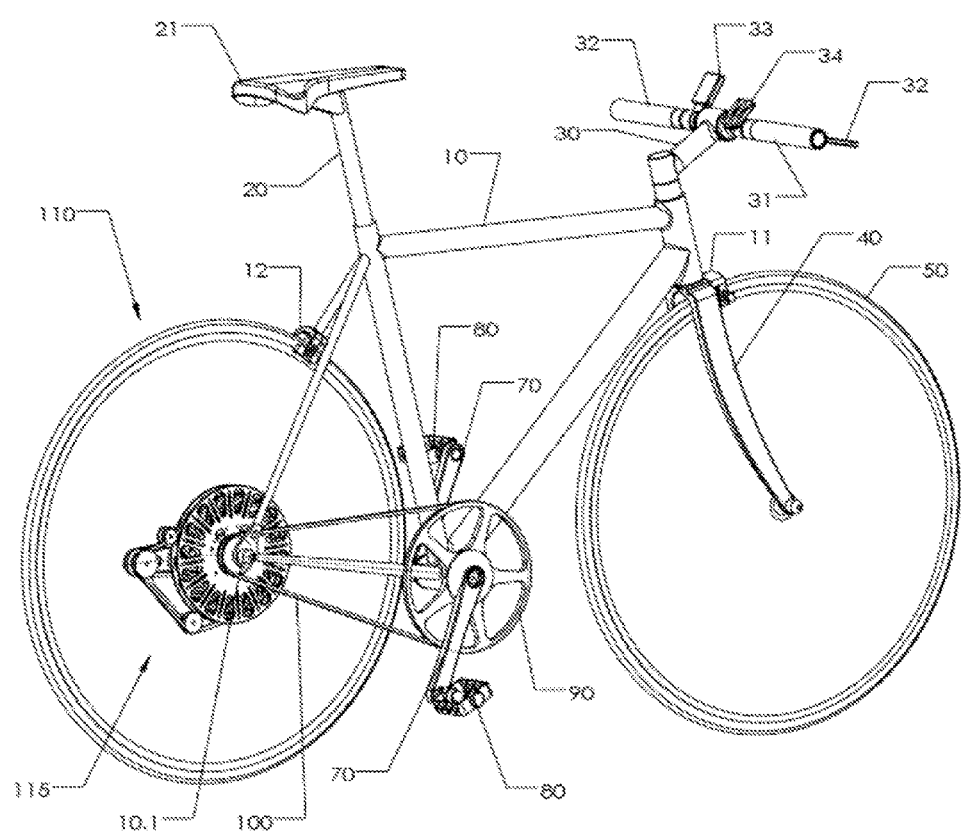

[FIG. 2]
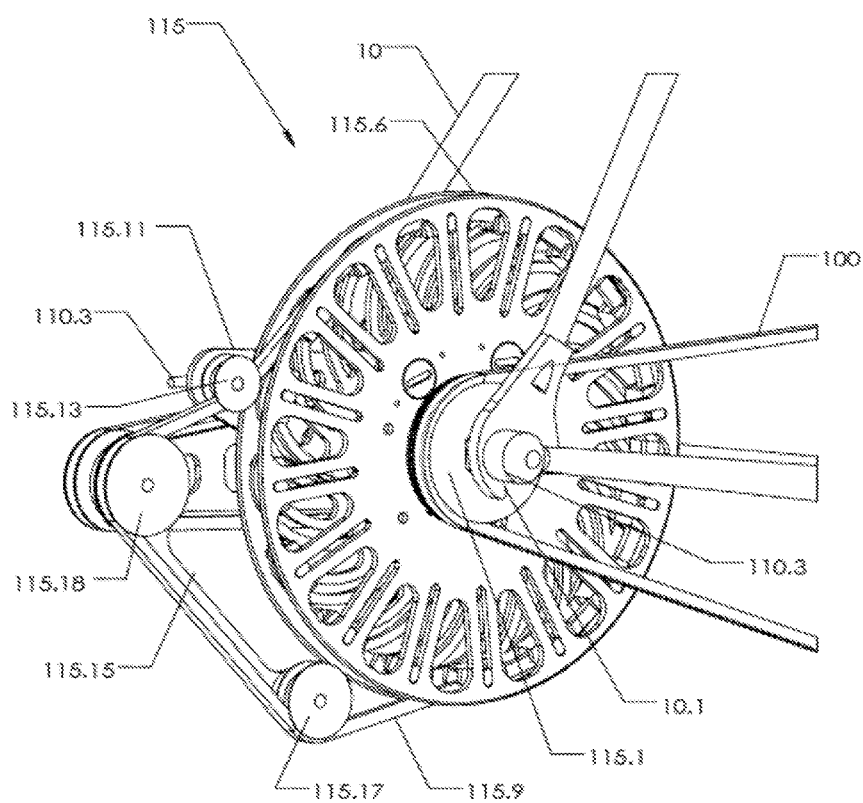

[FIG. 3]
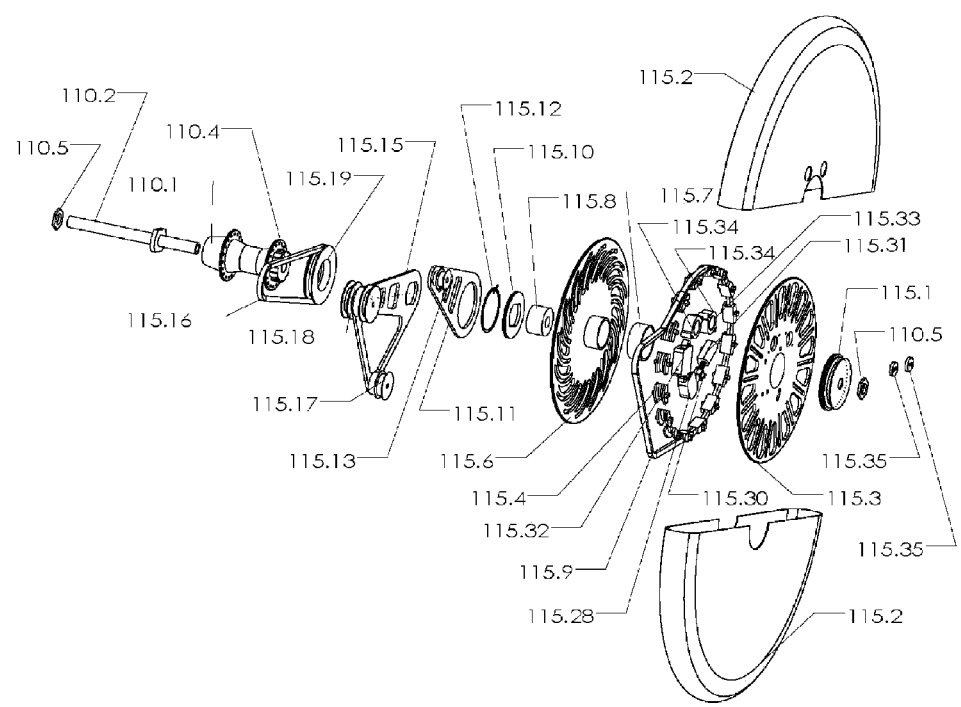

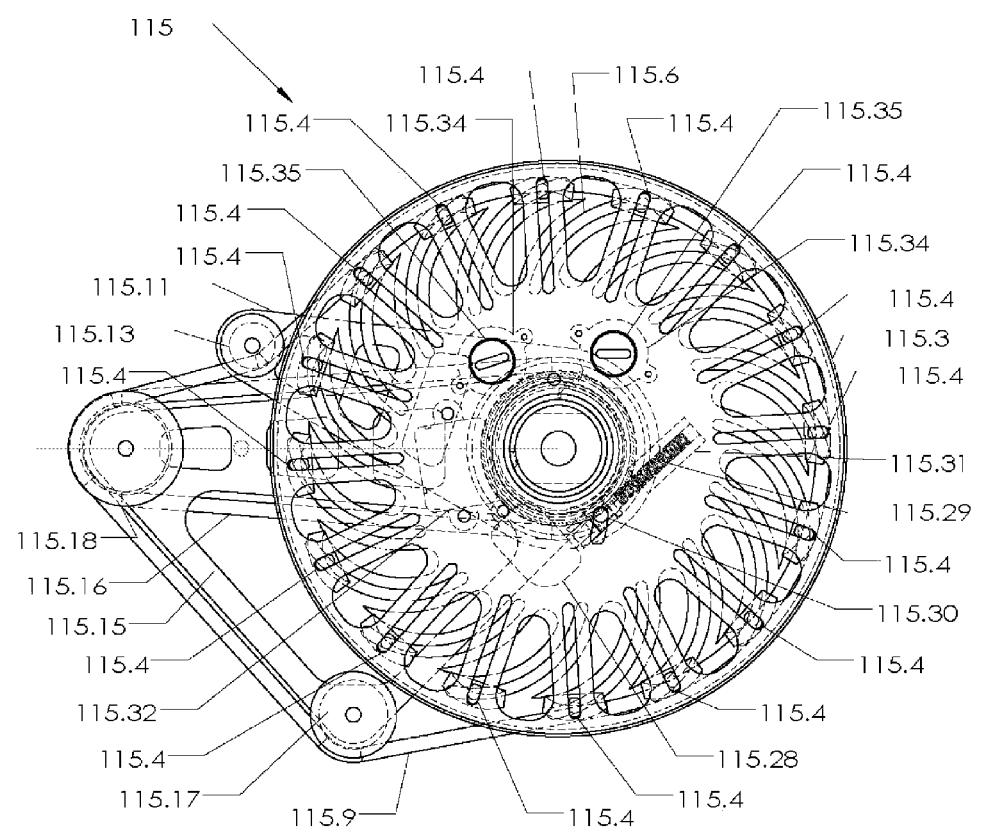
【FIG. 4A】

[FIG. 4B]
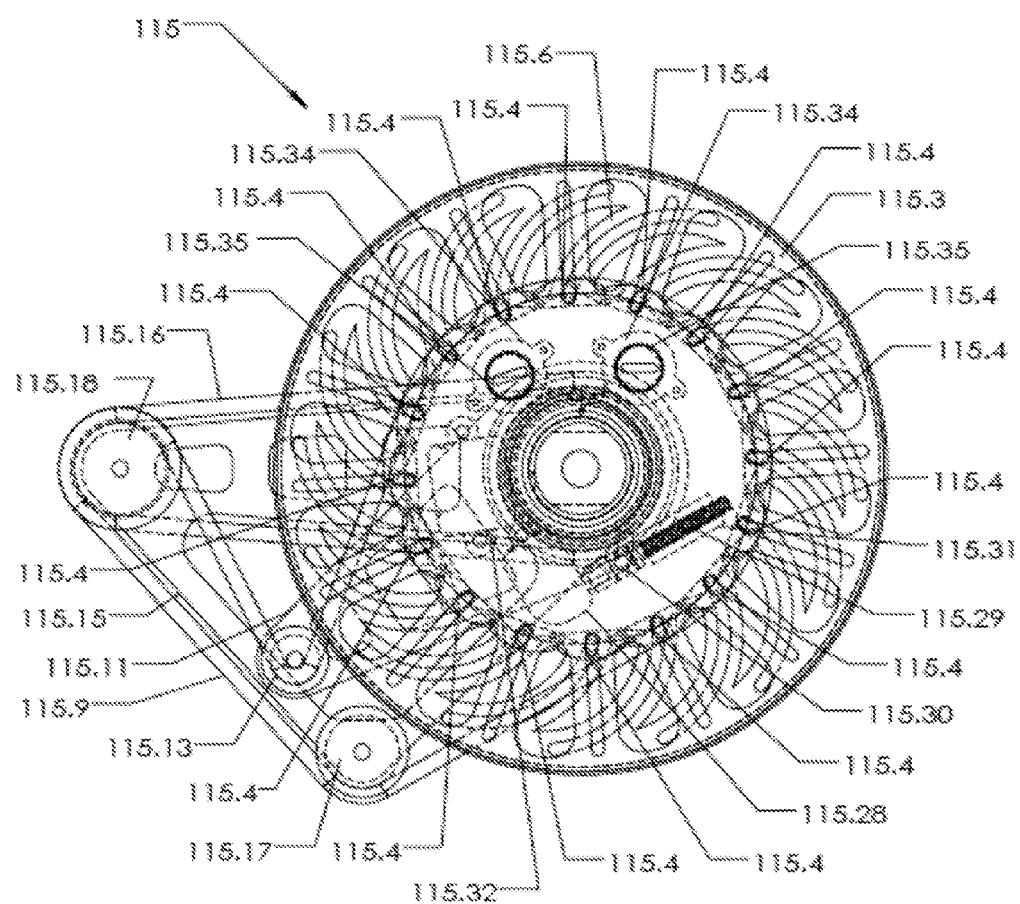

[FIG. 5]
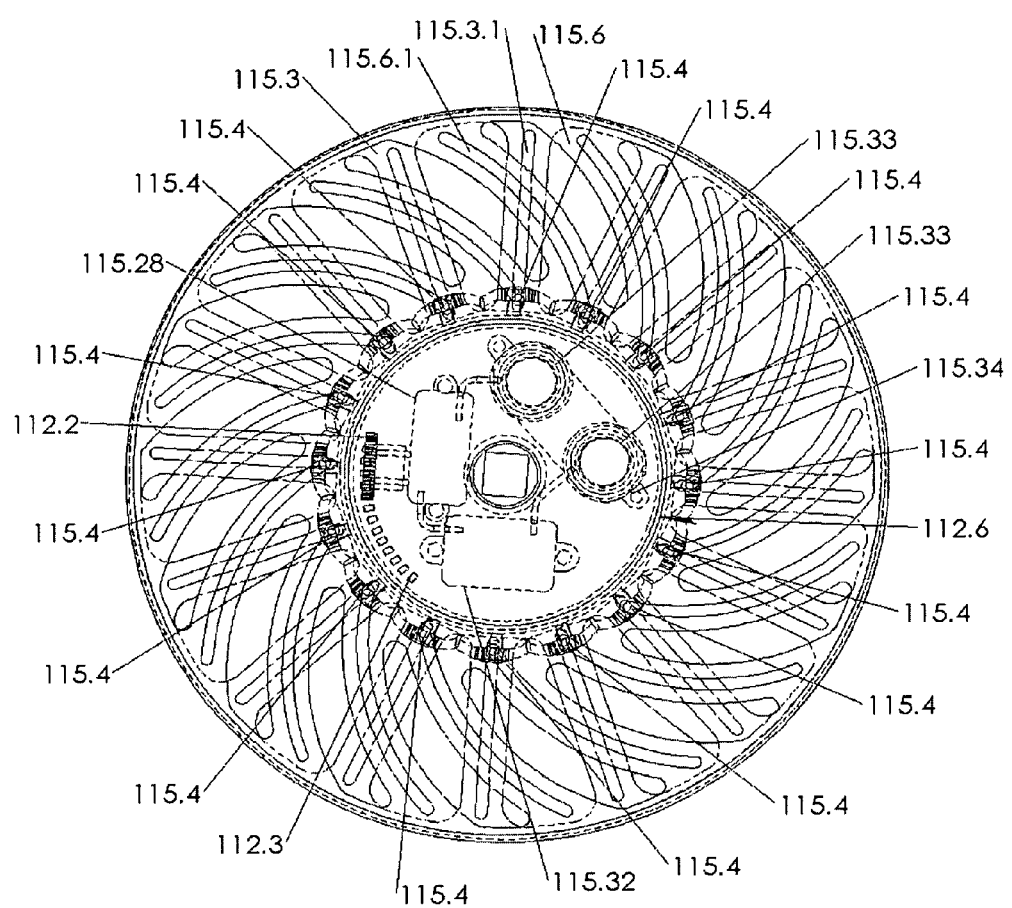

【FIG. 6】
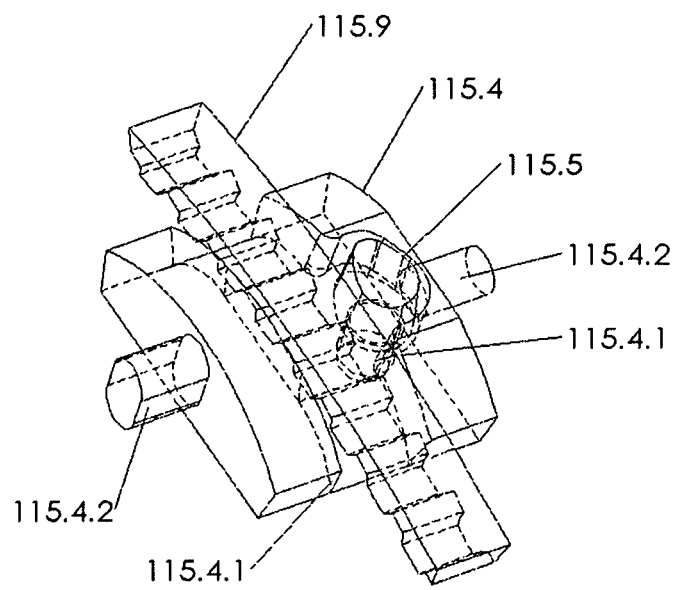
【FIG. 7】
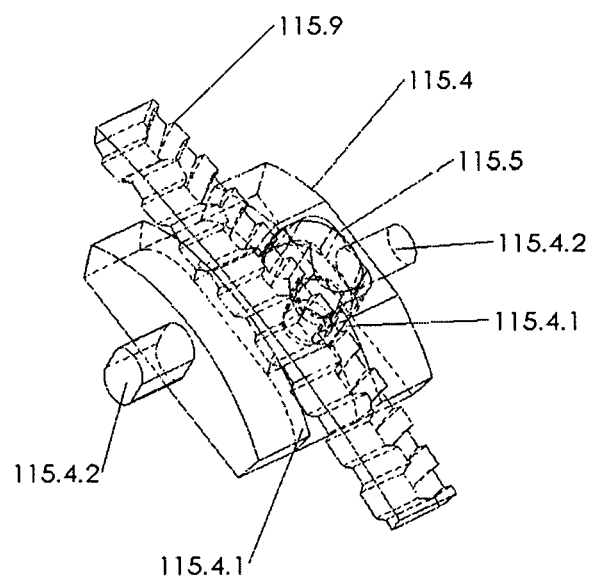

[FIG. 8]
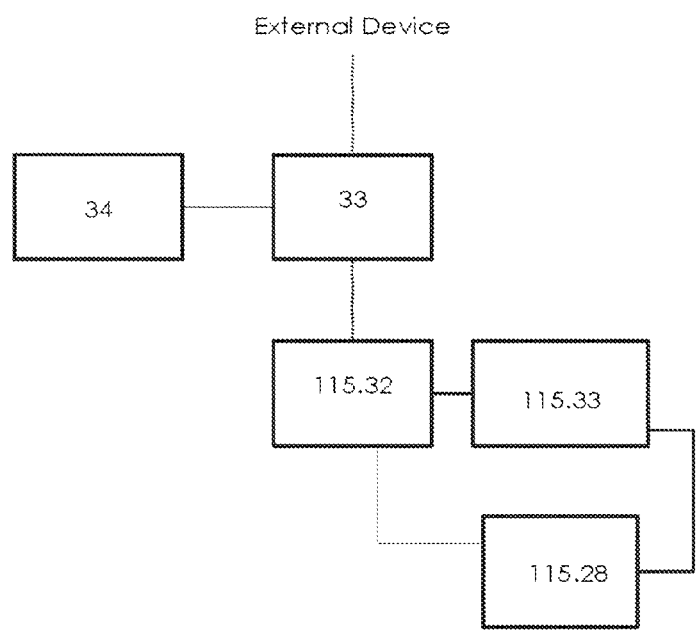

VARIABLE DIAMETER PULLEY ASSEMBLY AND CONTINUOUSLY VARIABLE TRANSMISSION USING THE SAME

TECHNICAL FIELD

The present invention relates to continuously variable transmissions capable of producing small increments of ratios between the input and output power, and more particularly, to a continuously variable transmission that employs a variable diameter pulley and is adaptable to any number of powered devices including devices using human power input or mechanical input.

BACKGROUND ART

A variety of devices have or may require the use of a transmission such to vary the parameters of speed and torque between the input and output. In many instances, such a transmission is desired to be relatively small and lightweight, and be capable of effecting relatively small increments of changes between the input and output ratio. Human powered vehicles are one example of such devices. Human-powered vehicle transport has had a relatively long history, and the vehicles produced have taken a variety of forms, and have employed a number of different transmissions or drive mechanisms. Among the different human-powered vehicle types, the bicycle has perhaps met with the most widespread use due its relatively compact and lightweight form, maneuverability, and efficiency in converting human muscle power to forward movement. Given the typical slope terrain conditions encountered by the human powered vehicle, a necessity has arisen to provide a drive system providing rider-selectable input-output drive ratios. Such a drive system allows the rider to adjust peddling speed and torque to best accommodate desired vehicle speed and terrain conditions, and a variety of means for such drive mechanisms have been proposed in the conventional art.

Perhaps the most common multi-ratio drive is provided by a front sprocket driven through foot pedals pivotally linked to cranks, and a rear sprocket cluster or cassette connected to the rear drive wheel. Typically, a loop-chain links the front and rear sprockets, and a rear derailleur provides means for the rider to select a given sprocket from the rear sprocket cluster to engage with the chain. In some cases, more than one front sprocket will be provided, forming thereby a front sprocket cluster; a second front derailleur provides means for the rider to select a given sprocket from the front sprocket cluster to engage with the chain. In a typical multi-ratio bicycle drive between 5 and 10 separate sprockets comprise the rear sprocket cluster, and between 1 and 3 separate sprockets comprise the front sprocket cluster, providing thereby a drive having between 5 and 30 user-selectable combinations.

The typical multi-ratio drive employing a chain, front and rear gear clusters, and derailleurs is perhaps the most common bicycle drive means in contemporary use. Unfortunately, such typical drives suffer from a number of disadvantages, including a relatively high mechanical complexity, weight, and unreliability. For example, the derailleur is a fairly sensitive mechanism, requiring precise adjustment, and which may easily become misaligned. Damage or misalignment may occur as the derailleurs are exposed to the weather, and are also vulnerable should the bicycle fall over. Should misalignment occur, the chain may become misplaced from the drive system, and may jam other moving parts of the bicycle; this condition may prove hazardous as the speed or direction of the vehicle may be abruptly altered. Another primary drawback of such typical drives is the steps between the user-selected ratios. The selected ratio is often not ideal for the given circumstances of terrain and available input power. As well, the variety of ratios offered by a combination of multiple front and rear sprockets may be confusing to all but the most experienced riders, causing the need for much trial and error to select the most suitable ratio. It is noted that while a given drive using both front a rear derailleurs may provide up to 30 user-selectable combinations, all such combinations will not produce a substantially different ratio than the others. Therefore, the number of distinct gear ratios is typically around 70% of possible gear ratios, and the number of easily usable distinct gear ratios is typically around 50% of possible gear ratios.

A rider may ride on relatively flat terrain one day, and relatively hilly terrain the next. The typical multi-gear and derailleur drive system may include a relatively wide range of gearing to accommodate these varied conditions. However, such inclusion of such multiple gearing is less than optimal as many of the gears contribute to added weight, and are not used in all conditions. Competitive cyclists may elect to change the gear sprockets to best address the terrain conditions of a given racecourse. However, this is a fairly involved procedure, and is not practical for the ordinary cyclist.

The typical multi gear and derailleur drive system is also relatively heavy. Weight is an important factor in bicycle drive systems, particularly for performance and competitive cycling. A number of components used in the typical multi sprocket and derailleur drive system individually and collectively contribute to the overall system weight. These typically include a link steel chain, front and rear derailleurs, the rear sprockets or cassette, and the front sprockets or chainrings.

A number of attempts have been proposed to improve upon the typical multi-ratio drive employing a chain, front and rear gear clusters, and derailleurs. A typical type is often referred to as a hub gear. Such drives incorporate multiple gears and means to select between gears that are housed within the rear wheel hub mechanism. Unfortunately these drives are typically heavier, less efficient, and offer fewer selectable gear ratios than the typical multi sprocket and derailleur drive system.

Attempts have been made to overcome the primary disadvantage of the steps between ratios in drives commonly referred to as "stepless" or "continuously-variable". Of the many types of proposed stepless drives, the majority suffer from a high degree of mechanical complexity, relatively high weight, a necessity for frequent maintenance and adjustment, and an inability to be fitted into, or to be retrofitted into a common bicycle frame and cooperate with other typical components. One such drive (see e.g., U.S. Pat. No. 8,167,759, Pohl et al., 2012) uses a plurality of traction planets, made able to rotate about a tiltable axis to provide a continuously variable transmission useable in various devices, including bicycles.

A seemingly straightforward means of accomplishing a stepless drive for human powered vehicles would be to provide a drive means able to vary the effective diameter of the driven pulley or sprocket. Drives of this type have been proposed in the conventional art, with a typical type containing a plurality of coordinated radially-disposed sprocket segments. Unfortunately, drives in the conventional art using such means are unable to provide a simple method to coordinate the radial displacement of the plurality of sprocket segments such to change the effective sprocket diameter. Of these types of drives, some propose to provide an "automatic" drive; one such example is given in U.S. Pat. No. 3,995,508, Newell, 1976, which discloses a drive using a plurality of sprocket segments spring-biased to the largest effective diameter, and which under increased input torque load will automatically overcome the spring bias to decrease the effective diameter. While an automatic drive of this type may offer convenience for novice and undemanding riders, those more skilled or desiring to compete in cycling sports will desire greater control of the drive ratio and input torque.

In another example, U.S. Pat. No. 4,938,732, Krude, 1990, discloses a stepless drive providing operator control over the input output ratio. This transmission provides a variable diameter pulley comprised of pulley segments that may be moved axially in the radial direction. Means to coordinate the pulley segments is provided by a first pair of disks disposed on one side of the pulley segments, and a second pair of disks disposed on the other side of the pulley segments. Each disk comprising each disk pair has radially disposed arcuate slots, and the arcuate slot sense of the pair is opposed, and with the space provided by the overlap condition able to accept a pin formed into the pulley segment. Each pair of disks is made able to rotate relative to the other, and to cause the space provided by the overlap condition to move in the axial direction. The means to control the effective diameter is first input by an actuator placed concentrically with the axis of rotation of the disks, and this motion is transferred to the radial direction with a plurality of actuator pins. The inclusion of four total disks, combined with the necessity to transfer actuation control from the rotational axis to the radial axis results in considerable complexity in the mechanism, a relatively high part count, and added weight. It will also be noted that the pulley segment engages with the space provided in the pair of opposed sense arcuate slots is round, and therefore this arrangement of elements does not constrain the pulley segments to the radial direction. As a result, other means need to be added to provide such constraint. Engagement between the pulley segments and drive belt is provided by contact friction, and no other means to provide higher levels of contact sliding resistance are incorporated.

In yet a further example, U.S. Pat. No. 3,956,944, Tompkins, 1976, discloses a variable ratio chain sprocket having a plurality of chain engaging segments slidingly affixed between a first pair of disks fixed to an axle having radially-deposed arcuate slots, and a second pair of disks, able to rotate freely about said axle having radially disposed straight slots. Each chain engaging segment is slidingly engaged with a respective straight and arcuate slot on a first side, and with a straight and arcuate slot on an opposed side. With the forgoing interrelationship of elements, the rotational displacement of the first pair of disks relative to the second pair of disks will cause the chain engaging segments to move in a radial fashion and thereby present varied effective sprocket diameters. A spring links the first pair of disks with the second pair of disks. When sufficient torque is applied to the input, the spring is stretched, and the rotational displacement of the first pair of disks relative to the second pair of disks is effected. As such this invention is of the "automatic" type described by Newell, and therefore suffers from the inability to provide the user means to control the input-output ratio directly as no actuator and control means is provided to accomplish this function. In addition, the invention requires inclusion of four total disks. Each pair of disks contacts each other that may cause considerable friction or the accumulation of dirt between them. Finally, the invention is only able to function with use of an endless chain, and does not give provision for use with an endless belt.

In a final example, GB19800034485 1980 1027, Deal, 1981, discloses a variable diameter sprocket having a plurality of sprocket segments disposed in a radial pattern slidingly affixed between a first disk fixed to an axle having radially-deposed arcuate slots, and a second disk, able to rotate freely about said axle having radially disposed straight slots. Each chain engaging segment is slidingly engaged with a respective arcuate slot on a first side, and with a straight slot on an opposed side. With the forgoing interrelationship of elements, the rotational displacement of the first disk relative to the second disk will cause the chain engaging segments to move in a radial fashion and thereby present varied effective sprocket diameters. A plurality springs link the first pair of disks with the second pair of disks. When sufficient torque is applied to the input, the springs are stretched, and the rotational displacement of the first and second disk is effected. As such this invention is of the "automatic" type described by Newell and Tomkins, and similarly suffers from the inability to provide the user means to control the input-output ratio directly as no actuator and control means is provided to accomplish this function. The invention is only able to function with use of an endless chain, and does not give provision for use with an endless belt.

In summary, it may be seen that conventional art variable ratio drives incorporated into human powered vehicles, such as bicycles, have a number of defects including complexity and unreliability, lack of intuitive ease of use, relatively high weight, and the inability to easily be retrofitted into existing bicycle frames and make use of and interface with other common bicycle components.

While the preceding discussion has given focus to the application of the continuously variable transmission to human powered vehicles in general, and bicycles in particular, it can be seen by one of ordinary skill the art, that the continuously variable transmission can have a wide range of applications to other powered vehicles, machines, and devices. As a first example, it will be noted that most vehicles encounter varying terrain conditions that necessitate adjustment of the parameters of speed and torque between the input and output. A low gear may be required to climb a steep slope, and a high gear may be required to increase the vehicle speed. Most all types of input power, such as an internal combustion engine, have limitations on torque, power, and speed, and may operate most efficiently in a fairly narrow band of such parameters. The input-output ratios provided by a transmission provide means to maintain the relative efficiency of the engine operation. Conventional multi-gear transmissions attempt to maintain such efficiency, but are limited to the number of gears in the transmission, and therefore only approximate the more ideal ratio needed at any given point in time. In contrast, a continuously variable transmission has infinitesimal steps between the input-output ratios, and thereby has means to provide a more ideal ratio needed at any given point in time.

As a second example, a number of machines or devices, such as a drill press, lathe, milling machine, or, windmill, to name but a few examples, also require varying speed, power, and torque parameters between the input and output. In typical machining operations, for example, various factors such as cutting head, feed rate, lubricant, plunge rate, and metal type must be calibrated with the speed and torque of the tool output. A tool, such as one having robotic control, may encounter variations of these factors in relatively quick secession, and must have the ability to adjust input-output ratios accordingly.

What is needed then is a continuously variable transmission that is relatively inexpensive to purchase and maintain, that has a simple and highly controllable drive mechanism, that limits the number of steps between drive ratios, that provides intuitive ease of use, is relatively light in weight, that may be fitted or retrofitted into common machine and vehicle frames and formats, and provides an efficient transfer of input power to an output. In addition, it is often found to be desirable to obtain information about the operation and conditions of a machine. Such information may include altitude, inclination, temperature, distance, speed, torque, gear ratio, and other inputs. Therefore, a drive mechanism that easily cooperates with an onboard computer, can wirelessly communicate with external devices, and extend the range of data collection would be desirable to those operating or managing such machines.

SUMMARY OF INVENTION

Technical Problem

The present invention is directed to a variable diameter pulley assembly having a continuously variable diameter and capable of engaging with a power transmission element such as a belt or a chain.

The present invention is also directed to an apparatus employing a continuously variable transmission including a variable diameter pulley assembly and capable of varying an input-output rotational power ratio steplessly over a predetermined range.

The present invention is also directed to an apparatus employing a continuously variable transmission including a variable diameter pulley assembly and means to predefine a set of drive ratios tailored to a given set of use conditions, and to adjust or override such predefined ratios at any time.

The present invention is also directed to an apparatus employing a continuously variable transmission including a variable diameter pulley assembly and allowing ease of adjusting the input-output drive ratio by providing actuator means within the drive.

The present invention is also directed to an apparatus employing a continuously variable transmission including a variable diameter pulley assembly and capable of offering a user a high degree of control and to accomplish input-output ratio changes in an intuitive manner in which the number of distinct gear ratios and easily usable distinct gear ratios are equal by limiting the number of gearing combinations.

The present invention is also directed to an apparatus employing a continuously variable transmission including a variable diameter pulley assembly and having relatively low weight by minimizing the size and number of necessary drive components, and by the ability to use low weight drive belts and other components.

The present invention is also directed to an apparatus employing a continuously variable transmission including a variable diameter pulley assembly and having high drive efficiency and low friction by decreasing multiple and compound gearing in the drive train.

The present invention is also directed to an apparatus employing a continuously variable transmission including a variable diameter pulley assembly and providing a high factor of safety by maintaining the primary drive elements in continuous linkage.

The present invention is also directed to an apparatus employing a continuously variable transmission including a variable diameter pulley assembly and having low maintenance and high reliability by using cost-effective, high-performance materials and components, and limiting the number of mechanical parts.

The present invention is also directed to an apparatus employing a continuously variable transmission including a variable diameter pulley assembly and providing a link to an incorporated microcomputer/data logger such to extend the amount of useful information from a given operation cycle.

The present invention is also directed to an apparatus employing a continuously variable transmission including a variable diameter pulley assembly and having the ability to link to an onboard microcomputer/data logger and that can wirelessly broadcast collected data to other computers or devices such to communicate operation information to others or for information storage and analysis.

Technical Solution

According to one aspect of the present invention, a variable diameter pulley assembly comprises: an axle defining an axis of rotation; a first side member coupled to rotate with the axle and formed with a plurality of first guideways; a second side member spatially separated from the first side member, coupled to rotate freely about the axle, and formed with a plurality of second guideways respectively corresponding to the first guideways of the first side member at a plurality of intersections arranged in a circle about the axis of rotation; a plurality of pulley segments configured to engage with a power transfer element for transferring rotary power to or from the variable diameter pulley assembly, the pulley segments coupled with the first and second guideways at the intersections so as to be arranged in the circle about the axis of rotation, the circle defining an effective diameter of the variable diameter pulley assembly; and actuator means for changing an angular displacement of the first side member relative to the second side member about the axis of rotation so as to cause a coordinated change in a radial displacement of the pulley segments coupled with the first and second guideways at the intersections arranged in the circle defining the effective diameter of the variable diameter pulley assembly, and thereby changing the effective diameter of the variable diameter pulley assembly.

Here, at least one of the plurality of first guideways and the plurality of second guideways may comprise arcuate guideways arranged in multiple-arm spiral pattern.

Also, the plurality of first guideways may comprise arcuate guideways arranged in a multiple-arm spiral pattern, and the plurality of second guideways may comprise straight guideways arranged in a radial pattern.

Here, the plurality of first guideways may comprise arcuate guideways arranged in a first multiple-arm spiral pattern, and the plurality of second guideways may comprise arcuate guideways arranged in a second multiple-arm spiral pattern having an opposite angular orientation to the first multiple-arm spiral pattern.

Also, at least one of the plurality of first guideways and the plurality of second guideways may comprise guideways of at least one type belonging to the group consisting of grooves, slots, and tracks.

Also, each of the pulley segments may comprise: a central shank portion configured to engage with the power transfer element for transferring rotary power to or from the variable diameter pulley assembly; and a pair of bearing portions extending longitudinally from opposite ends of the central shank portion and respectively coupled with a corresponding one of the first guideways and a corresponding one of the second guideways at a corresponding one of the intersections.

Here, the pair of bearing portions may be formed with an elongated cross-section allowing the pulley segments to slide forward and backward along corresponding first and second guideways while preventing the pulley segments from rotating.

Also, the power transfer element may be a belt.

Here, the belt may comprise notches formed in at least one side thereof at a predetermined interval, and the central shank portion of each of the pulley segments may be configured to engage with the belt at positions along the belt corresponding to the notches formed at the predetermined interval for transferring rotary power to or from the variable diameter pulley assembly.

Also, the central shank portion of each of the pulley segments may be configured to engage with the belt at any position along the belt for transferring rotary power to or from the variable diameter pulley assembly.

Here, the central shank portion of each of the pulley segments may comprise: a base contacting one side of the belt; a pair of sidewalls preventing the belt from slipping sideways off of the base; and a cam member rotatably installed in at least one of the pair of sidewalls to contact at least one side of the belt, movement of the belt perpendicular to an axis of rotation of the cam member causing the cam member to rotate and apply a clamping force to the belt.

Also, the power transfer element may be a chain.

Here, the central shank portion of each of the pulley segments may comprise at least one tooth configured to mesh with the chain.

Also, the actuator means may comprise: a power source; an actuator pivotally connected to the first side member, powered by the power source, and configured to rotate an actuator lead screw in response to a control signal; an actuator lead screw follower pivotally connected to the second side member and threadingly engaged with the actuator lead screw; and control means configured to generate the control signal and supply the control signal to the actuator in response to a user input, wherein rotation of the actuator lead screw by the actuator in response to the control signal causes a change in displacement between the actuator pivotally connected to the first side member and the actuator lead screw follower pivotally connected to the second side member that results in a change in the angular displacement of the first side member relative to the second side member.

Also, the actuator means may comprise: a power source; an actuator fixedly connected to the first side member, powered by the power source, and configured to rotate an actuator pinion gear in response to a control signal; an arcuate gear strip fixedly connected to the second side member and meshingly engaged with the actuator pinion gear; and control means configured to generate the control signal and supply the control signal to the actuator in response to a user input, wherein rotation of the actuator pinion gear by the actuator in response to the control signal applies a torque to the arcuate gear strip about the axis of rotation which causes a change in the angular displacement of the first side member relative to the second side member.

According to another aspect of the present invention, an apparatus comprises a rotary power source and a continuously variable transmission coupled to the rotary power source, the continuously variable transmission comprising a first pulley assembly, a second pulley assembly, and an endless power transfer element coupled about the first pulley assembly and the second pulley assembly for transferring rotary power therebetween, the first pulley assembly being of a variable diameter type for adjusting a turning ratio relative to the second pulley assembly, the first pulley assembly comprising: a first axle defining a first axis of rotation; a first side member coupled to rotate with the first axle and formed with a plurality of first guideways; a second side member spatially separated from the first side member, coupled to rotate freely about the first axle, and formed with a plurality of second guideways respectively corresponding to the first guideways of the first side member at a plurality of intersections arranged in a circle about the first axis of rotation; a plurality of pulley segments configured to engage with the endless power transfer element for transferring rotary power to or from the first pulley assembly, the pulley segments coupled with the first and second guideways at the intersections so as to be arranged in the circle about the first axis of rotation, the circle defining an effective diameter of the first pulley assembly; actuator means for changing an angular displacement of the first side member relative to the second side member about the first axis of rotation so as to cause a coordinated change in a radial displacement of the pulley segments coupled with the first and second guideways at the intersections arranged in the circle defining the effective diameter of the first pulley assembly, and thereby changing the effective diameter of the first pulley assembly; and tensioner means for maintaining tension in the endless power transfer element.

Here, the first pulley assembly may be directly coupled to the rotary power source to receive rotary power therefrom.

Also, the second pulley assembly may be directly coupled to the rotary power source to receive rotary power therefrom.

Also, the first pulley assembly may further comprise: an input pulley coupled to the first side member to rotate with the first axle and the first side member, the input pulley coupled to the rotary power source via an endless input power transfer element to receive rotary power therefrom.

Here, the endless input power transfer element may be a chain and the input pulley may be a sprocket.

Also, the second pulley assembly may comprise: a second axle defining a second axis of rotation; and an output pulley coupled to rotate with the second axle, the output pulley coupled to the first pulley assembly via the endless power transfer element to receive rotary power therefrom.

Here, the second axis of rotation may coincide with the first axis of rotation, and the second pulley assembly may further comprise: a double-wheel pulley disposed off of the first axis of rotation and having first and second wheels arranged side-by-side to rotate together, the first wheel coupled to the first pulley assembly via the endless power transfer element to receive rotary power therefrom, and the second wheel coupled to the output pulley via an endless output power transfer element to transfer rotary power thereto; an idler pulley disposed off of the first axis of rotation, separated by predetermined distance from the first wheel of the double-wheel pulley, and coupled to the first wheel of the double-wheel pulley and the first pulley assembly by the endless power transfer element so as to widen a loop made by the endless power transfer element; and a support member supporting the double-wheel pulley and the idler pulley.

Also, the endless output power transfer element may be a chain, the second wheel of the double wheel pulley may be a sprocket, and the output pulley may be a sprocket.

Also, at least one of the plurality of first guideways and the plurality of second guideways may comprise arcuate guideways arranged in multiple-arm spiral pattern.

Here, the plurality of first guideways may comprises arcuate guideways arranged in a multiple-arm spiral pattern, and the plurality of second guideways may comprise straight guideways arranged in a radial pattern.

Also, the plurality of first guideways may comprise arcuate guideways arranged in a first multiple-arm spiral pattern, and the plurality of second guideways may comprise arcuate guideways arranged in a second multiple-arm spiral pattern having an opposite angular orientation to the first multiple-arm spiral pattern.

Also, at least one of the plurality of first guideways and the plurality of second guideways may comprise guideways of at least one type belonging to the group consisting of grooves, slots, and tracks.

Also, each of the pulley segments may comprise: a central shank portion configured to engage with the endless power transfer element for transferring rotary power to or from the first pulley assembly; and a pair of bearing portions extending longitudinally from opposite ends of the central shank portion and respectively coupled with a corresponding one of the first guideways and a corresponding one of the second guideways at a corresponding one of the intersections.

Here, the pair of bearing portions may be formed with an elongated cross-section allowing the pulley segments to slide forward and backward along corresponding first and second guideways while preventing the pulley segments from rotating.

Also, the endless power transfer element may be a belt.

Here, the belt may comprise notches formed in at least one side thereof at a predetermined interval, and the central shank portion of each of the pulley segments may be configured to engage with the belt at positions along the belt corresponding to the notches formed at the predetermined interval for transferring rotary power to or from the first pulley assembly.

Also, the central shank portion of each of the pulley segments may be configured to engage with the belt at any position along the belt for transferring rotary power to or from the first pulley assembly.

Here, the central shank portion of each of the pulley segments may comprise: a base contacting one side of the belt; a pair of sidewalls preventing the belt from slipping sideways off of the base; and a cam member rotatably installed in at least one of the pair of sidewalls to contact at least one side of the belt, movement of the belt perpendicular to an axis of rotation of the cam member causing the cam member to rotate and apply a clamping force to the belt.

Also, the endless power transfer element may be a chain.

Here, the central shank portion of each of the pulley segments may comprise at least one tooth configured to mesh with the chain.

Also, the actuator means may comprise: a power source; an actuator pivotally connected to the first side member, powered by the power source, and configured to rotate an actuator lead screw in response to a control signal; an actuator lead screw follower pivotally connected to the second side member and threadingly engaged with the actuator lead screw; control means configured to generate the control signal and supply the control signal to the actuator in response to a user input, wherein rotation of the actuator lead screw by the actuator in response to the control signal causes a change in displacement between the actuator pivotally connected to the first side member and the actuator lead screw follower pivotally connected to the second side member that results in a change in the angular displacement of the first side member relative to the second side member.

Also, the actuator means may comprise: a power source; an actuator fixedly connected to the first side member, powered by the power source, and configured to rotate an actuator pinion gear in response to a control signal; an arcuate gear strip fixedly connected to the second side member and meshingly engaged with the actuator pinion gear; control means configured to generate the control signal and supply the control signal to the actuator in response to a user input, wherein rotation of the actuator pinion gear by the actuator in response to the control signal applies a torque to the arcuate gear strip about the axis of rotation which causes a change in the angular displacement of the first side member relative to the second side member.

Here, the control means may comprise: a computer configured to generate the control signal and supply the control signal to the actuator in response to a user input; and an interface configured to receive the user input and provide the user input to the computer.

Also, the control means may comprise: a wireless transceiver configured to receive the control signal and supply the control signal to the actuator; a computer configured to generate the control signal and wirelessly transmit the control signal to the transceiver in response to a user input or other sensory input; and an interface configured to receive the user or sensor input and provide the user or sensor input to the computer.

Also, the control means may comprise: a computer configured to generate the control signal and supply the control signal to the actuator in response to a user input; an interface configured to receive the user input and provide the user input to the computer; and sensor means configured to sense a state of the actuator means and supply the sensed state to the computer as feedback.

Here, the computer may be configured to wirelessly transmit information including the state of the actuator means received from the sensor means to an external device.

Also, the tensioner means may comprise: a tensioner idler pulley coupled to rotate about a third axis of rotation, the tensioner idler pulley coupled to the first pulley assembly and the second pulley assembly by the endless power transfer element to rotate therewith; a tensioner support member pivotally installed about one of the first axis and the second axis and supporting the tensioner idler pulley; and a tensioner spring applying a rotational bias to the tensioner support member so that the tensioner idler pulley applies a force to the endless power transfer element in a transverse direction thereof, so as to keep the endless power transfer element in tension.

Also, the apparatus may further comprise: a housing configured to protect at least one of the first pulley assembly and the second pulley assembly within a water and dirt resistant enclosure.

Also, the apparatus may be employed as a drive mechanism of a human-powered vehicle.

Here, the human-powered vehicle may be a bicycle and the apparatus may be easily retrofitted onto an existing bicycle frame.

Advantageous Effects of Invention

The present invention improves upon existing variable ratio drives by providing greater safety, reliability, weight-savings, intuitive ease of use, selectable drive ratios, and drive train efficiency. Further objects and advantages of this invention will become apparent from a consideration of the drawings and ensuing description.

BRIEF DESCRIPTION OF DRAWINGS

The above and other objects, features and advantages of the present invention will become more apparent to those of ordinary skill in the art by describing in detail exemplary embodiments of the invention with reference to the attached drawings, in which:

FIG. 1 schematically illustrates, in an isometric view, a first embodiment of the continuously variable transmission fitted to a bicycle;

FIG. 2 schematically illustrates, in a detail isometric view, selected components of a first embodiment of the continuously variable transmission fitted to a bicycle;

FIG. 3 schematically illustrates, in an exploded isometric view, selected components of a first embodiment of the continuously variable transmission;

FIG. 4A illustrates, in a side view, selected components of the drive assembly of a first embodiment of the continuously variable transmission positioned in a low drive ratio position;

FIG. 4B illustrates, in a side view, a first embodiment selected components of the drive assembly of the continuously variable transmission positioned in a high drive ratio position;

FIG. 5 illustrates, in a side view, selected components of the drive assembly of a second embodiment of the continuously variable transmission positioned in a low drive ratio position;

FIG. 6 illustrates, in a detail isometric view, a first embodiment of selected drive components of the continuously variable transmission;

FIG. 7 illustrates, in a detail isometric view, a second embodiment of selected drive components of the continuously variable transmission; and FIG. 8 schematically illustrates, in a diagram view, the interconnection of electrical drive power, communication, and control components of a first embodiment of the continuously variable transmission.

DESCRIPTION OF EMBODIMENTS

Example embodiments of the present invention are described below in sufficient detail to enable those of ordinary skill in the art to embody and practice the present invention. However, the present invention may be embodied in many alternative forms and must not be construed as limited to the example embodiments set forth herein.

It will be understood that, although the terms first, second, A, B, etc. may be used herein in reference to elements of the invention, such elements should not be construed as limited by these terms. For example, a first element could be termed a second element, and a second element could be termed a first element, without departing from the scope of the present invention. Herein, the term "and/or" includes any and all combinations of one or more referents.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements. Other words used to describe relationships between elements should be interpreted in a like fashion (i.e., "between" versus "directly between," "adjacent" versus "directly adjacent," etc.).

The terminology used herein to describe embodiments of the invention is not intended to limit the scope of the invention. The articles "a," "an," and "the" are singular in that they have a single referent, however the use of the singular form in the present document should not preclude the presence of more than one referent. In other words, elements of the invention referred to in the singular may number one or more, unless the context clearly indicates otherwise. It will be further understood that the terms "comprises," "comprising," "includes," and/or "including," when used herein, specify the presence of stated features, numbers, steps, operations, elements, and/or components, but do not preclude the presence or addition of one or more other features, numbers, steps, operations, elements, components, and/or groups thereof.

Unless otherwise defined, all terms (including technical and scientific terms) used herein are to be interpreted in the customary way in the art to which this invention belongs. It will be further understood that terms in common usage should also be interpreted as is customary in the relevant art and not in an idealized or overly formal sense unless expressly so defined herein. While parts of the present invention are named and described below with reference to their functionalities, alternative terminology may be employed, as desired by a user, operator, or according to conventional practice, without altering the content of the disclosure.

Throughout the drawings and the description, parts that appear in more than one drawing or are mentioned in more than one place in the description are consistently denoted by the same respective reference numerals.

FIG. 1 schematically illustrates, in an isometric view, a first embodiment of the continuously variable transmission fitted to a bicycle. For the purposes of illustration, the present view depicts the continuously variable transmission mounted on one of a standard bicycle frame 10. The continuously variable transmission can be fitted to a variety of bicycles of common use and manufacture, or could be used with other types of human powered vehicles, or other devices where the ratio between a power input and output is desired. One of a seat post 20 is slip fit into frame 10 and fixed at a predetermined height. One of a seat 21 is fixed to seat post 20 at a predetermined upper terminal end. One of a fork 40 is slip fit into frame 10 and fixed to bar stem 30, and by such arrangement fork 40 is able to be rotated about its longitudinal axis and provide means to steer the bicycle. One of a front brake 11 is fixed to fork 40. One of a rear brake 12 is fixed to frame 10. One of a handlebar 31 is fixed to bar stem 30. Two of a brake lever 32 is fixed to handlebar 31. One of a front wheel 50 is pivotally connected to fork 40. One of a rear wheel 110 is pivotally connected to two of a frame dropout 10.1 incorporated into frame 10. Two of a pedal 80 is shown. Pedal 80, for the purposes of the present illustration is of a type in common use and manufacture. Pedal 80 is comprised of a body having a generally flat area to allow a rider's foot to contact the pedal. One pedal 80 is pivotally connected to one of a crank 70. Each crank 70 is fixed one to the other and are pivotally connected to frame 10. It will be noted that the forgoing elements and interrelationships are common to the majority of multi-gear bicycles of common use and manufacture. These elements are indicated to show that the continuously variable transmission may integrate with such common elements, as will become more evident in the ensuing description.

The primary control components of the present invention are comprised of one of a computer 33, and one of a gear shifter 34. Gear shifter 34 is shown mounted on handlebar 31. The size of gear shifter 34 is relatively small, and therefore can be accommodated on most standard handlebar types. It will be noted that the function of gear shifter 34 could be accommodated in other forms, or be located in other positions, or be incorporated into other elements. For example, gear shifter 34 could be incorporated into brake lever 32, or be incorporated into another handlebar component, such as a handlebar grip. Gear shifter 34 incorporates means to receive the input of the rider such as by pushing a button that inputs a command to change the gear ratio. Computer 33 is shown mounted on handlebar 31. The size of computer 33 is relatively small, and therefore can be accommodated on most standard handlebar types. The function of computer 33 could be accommodated in other forms, or be located in other positions, or be incorporated into other elements. For example, computer 33 could be worn by the rider, or be located on another portion of the vehicle. Computer 33 incorporates means to receive the command signal for a gear change from gear shifter 34, to process this signal, and send a command signal to one of a drive assembly 115.

Drive assembly 115 is rotationally engaged with rear wheel 110. One of a front drive pulley 90 is fixed to a selected crank 70. One of a drive belt 100 is engaged with front drive pulley 90 and drive assembly 115. With the interrelationships of the forgoing elements, a rider is able to sit on, steer, and brake the bicycle, and can input power to the rear wheel through a rotation of pedals 80 in the direction of forward motion.

Front drive pulley 90 serves a function analogous to the front sprocket or chain ring in a typical bicycle, and provides the first rotational link at the input side of a rotational drive system. While a pulley and belt system is currently shown, it is to be noted that other means of transferring rotational force from the front portion of the bicycle to the rear of the bicycle are possible. For example, a front sprocket could be used in lieu of front drive pulley 90, and a rear wheel sprocket could be used in lieu of drive input pulley 115.1, and a chain could be used in lieu of drive belt 100. In such an example, the bicycle would employ a chain drive system for the power input in lieu of a belt drive system. In the event a belt drive system is employed with the continuously variable transmission on a bicycle, the bicycle frame would provide means to thread the continuous loop belt through the frame.

FIG. 2 schematically illustrates, in a detail isometric view, selected components of the continuously variable transmission fitted to a bicycle. FIG. 3 schematically illustrates, in an exploded isometric view, selected components of the continuously variable transmission. It will be noted that rear wheel 110 as illustrated is a spoke type wheel that uses spokes to transfer rotational force from one of a rear wheel hub 110.1 to the wheel rim and tire. For the clarity of the present illustration, the spokes have been omitted. Rear wheel 110 has one of a rear wheel axle 110.2 that serves as the point of rotation. Rear wheel axle 110.2 is of a tubular form. The respective two outermost ends of rear wheel axle 110.2 project slightly beyond the outermost respective surfaces of the two frame dropouts 10.1 and which are also engaged into a slot formed into each frame dropout 10.1. One of a rear wheel skewer 110.3 is placed though the interior of the tubular form of rear wheel axle 110.2. Rear wheel skewer 110.3 provides means to apply a clamping force between the ends of rear wheel axle 110.2 and frame dropouts 10.1 thereby preventing rear wheel axle 110.2 from rotational or lateral movement relative to frame 10.

Rear wheel hub 110.1 is placed in a concentric relationship to rear wheel axle 110.2 and incorporates bearing means to allow free rotation about rear wheel axle 110.2. Rear wheel hub 110.1 is constrained about the longitudinal axis of rear wheel axle 110.2 by one of a rear wheel axle nut 110.5 threaded on rear wheel axle 110.2 at each terminal end. Through the forgoing relationships of rear wheel axle 110.2, rear wheel hub 110.1, and rear wheel axle nuts 110.5, rear wheel 110 is fixed to frame 10 and made able to rotate about rear wheel axle 110.2.

One of a rear wheel freewheel 110.4 is placed in a concentric relationship to rear wheel hub 110.1 such that the inside diameter of rear wheel freewheel 110.4 is placed in close proximity to the outside diameter of a cylindrical extrusion on one end of rear wheel hub 110.1. Rear wheel hub 110.1 as shown is of a type of common use and manufacture that is typically used in conjunction with multi-gear derailleur drive systems. Rear wheel freewheel 110.4 incorporates a ratchet means that engages with the rotational motion of rear wheel hub 110.1 with rotations in the direction of forward travel, and which disengages with rotations in the opposite direction of forward travel. The outer diameter of the generally cylindrical face of rear wheel freewheel 110.4 is splined. When rear wheel freewheel 110.4 is used in conjunction with a multi-gear derailleur drive system, a multi-gear sprocket cluster or cassette is slid over rear wheel freewheel 110.4 and engages with its splined outer face such that the cassette is rotationally engaged with rear wheel freewheel 110.4. In the case of the present invention, drive assembly 115 is used in lieu of a cassette.

One of a drive output pulley 115.19 is slid over rear wheel freewheel 110.4 and engages with its splined outer face such that drive output pulley 115.19 is caused to rotate with rear wheel freewheel 110.4. Drive output pulley 115.19 as shown is of a type used in conjunction with a typical V-belt; however, other types of pulleys could be employed for use with other belt types, including synchronous belt types. One of a drive transfer belt arm 115.15 is generally comprised of a plate having a hole on one terminal end that is shaped with two opposed arcuate surfaces and two opposed flat surfaces and that is placed in a concentric relationship to rear wheel axle 110.2. Rear wheel axle has an extrusion formed on its outer surface that is shaped with two opposed arcuate surfaces and two opposed flat surfaces. Drive transfer belt arm 115.15 is slip fit over the extrusion formed on the outer surface of rear wheel axle 110.2. Due to the flat surfaces of the respective mated elements, drive transfer belt arm 115.15 is prevented from rotating with respect to rear wheel axle 110.2. As has been mentioned earlier, rear wheel axle is fixed in position relative to frame 10, and therefore drive transfer belt arm 115.15 is fixed in position and is prevented from rotating with respect to other elements of the present invention. One of a drive transfer belt idler pulley 115.17 is pivotally connected at a second terminal end of drive transfer belt arm 115.15, and one of a drive transfer belt transfer pulley 115.18 is pivotally connected at a third terminal end of drive transfer belt arm 115.15. A drive takeoff belt 115.9 is rotationally engaged with drive transfer belt transfer pulley 115.18 and drive transfer belt idler pulley 115.17.

One of a drive takeoff belt tensioner pivot mount 115.10 is shown. Drive takeoff belt tensioner pivot mount 115.10 is generally comprised of a plate having a hole on one terminal end that is shaped with two opposed arcuate surfaces and two opposed flat surfaces and that is placed in a concentric relationship to rear wheel axle 110.2. Drive takeoff belt tensioner pivot mount 115.10 is slip fit over the extrusion formed on the outer surface of rear wheel axle 110.2. Due to the flat surfaces of the respective mated elements, drive takeoff belt tensioner pivot mount 115.10 is prevented from rotating with respect to rear wheel axle 110.2. Drive takeoff belt tensioner pivot mount 115.10 is formed with a circular shape on its outer surface, and a groove is formed around the full circumference of this surface. One of a drive takeoff belt tensioner spring 115.12 is placed into the groove formed in drive takeoff belt tensioner pivot mount 115.10. Drive takeoff belt tensioner spring 115.12 as shown is a coil type spring having one terminal end bent outwardly and a second terminal end bent outwardly. The first terminal end of drive takeoff belt tensioner spring 115.12 is fixed to a selected position on drive takeoff belt tensioner pivot mount 115.10. One of a drive takeoff belt tensioner arm 115.11 is shown. Drive takeoff belt tensioner arm 115.11 is generally comprised of a plate having a hole on one terminal end having a diameter that is just slightly larger than the diameter of the outer surface of drive takeoff belt tensioner pivot mount 115.10, and is placed in a concentric relationship with takeoff belt tensioner pivot mount 115.10. The second terminal end of drive takeoff belt tensioner spring 115.12 is fixed to a selected position on drive takeoff belt tensioner arm 115.11. By the forgoing relationships of drive takeoff belt tensioner pivot mount 115.10, drive takeoff belt tensioner spring 115.12, and drive takeoff belt tensioner arm 115.11, drive takeoff belt tensioner arm 115.11 is made able to rotate with respect to drive takeoff belt tensioner pivot mount 115.10 and rear wheel axle 110.2, and is biased toward one direction of rotation due to the rotational force imparted by drive takeoff belt tensioner spring 115.12. One of a belt tensioner idler pulley 115.13 is pivotally connected at a second terminal end of drive takeoff belt tensioner arm 115.11. Drive takeoff belt 115.9 is rotationally engaged with drive transfer belt transfer pulley 115.18, belt tensioner idler pulley 115.13, drive transfer belt idler pulley 115.17, and the plurality of drive pulley segment 115.4.

One of a drive pulley ring bearing 115.8 is placed in a concentric position relative to rear wheel axle 110.2 and generally abutting drive takeoff belt tensioner arm 115.11. The interior surface of drive pulley bearing 115.8 is fixed with respect to rotations about rear wheel axle 110.2, and the outer surface of drive pulley bearing 115.8 is allowed to freely rotate about rear wheel axle 110.2. One of a drive pulley inner ring side member 115.6 is shown. Drive pulley inner ring side member 115.6 is generally comprised by a tubular form adjoined to a disk shape plate. The inner surface of the tubular form of drive pulley inner ring side member 115.6 is fixed to the outer surface of drive pulley bearing 115.8, and thus is made able to freely rotate with respect to rear wheel axle 110.2. One of a drive pulley ring isolation bearing 115.7 is positioned such that its inner diameter surface is substantially contacting the outer diameter surface of the tubular form of drive pulley inner ring side member 115.6. One of a drive pulley outer ring side member 115.3 is positioned such that its inner diameter surface is substantially contacting the outer diameter surface of drive pulley ring isolation bearing 115.7. By the relationships of the forgoing elements, drive pulley outer ring side member 115.3 is free to rotate with respect to drive pulley inner ring side member 115.6, and with respect to rear axle 110.2.

The plurality of drive pulley segment 115.4 are disposed in a radial configuration relative to rear wheel axle 110.2 and such that the vertical surfaces are generally parallel and in close proximity to the inner vertical surfaces of the adjacent sides of drive pulley outer ring side member 115.3 and drive pulley inner ring side member 115.6. Each drive pulley segment 115.4 is slidingly engaged at one side with an arcuate slot formed into drive pulley inner ring side member 115.6, and is slidingly engaged at the opposed side with a straight slot formed into drive pulley outer ring side member 115.3. With the introduction of a rotational force between drive pulley outer ring side member 115.3 and drive pulley inner ring side member 115.6 the plurality of pulley segment carriage 115.4 will be caused to move toward rear wheel axle 110.2, and with the introduction of an opposite rotational force between drive pulley outer ring side member 115.3 and drive pulley inner ring side member 115.6 the plurality of pulley segment carriage 115.4 will be caused to move away from rear wheel axle 110.2. For the purposes of the present illustration, a total of 16 drive pulley segment 115.4 are radially disposed at 22.5 degrees. The actual number of drive pulley segment 115.4 in a given embodiment of the variable ratio drive may vary.

Drive takeoff belt 115.9 engages with the plurality of drive pulley segment 115.4 and is of fixed length. Drive takeoff belt 115.9 as shown is what is commonly referred to as a "V-Belt". Drive takeoff belt 115.9 may be comprised of rubber, synthetic rubber, or plastics, such as urethane, and be reinforced with steel cords, or composite cords, such as carbon or aramid fibers. Other belt types may be incorporated into the variable ratio drive; however, the V-belt type offers the advantage of self-alignment with the respective pulleys and drive pulley segment 115.4 that it engages, and mitigates against the displacement of drive takeoff belt 115.9. Drive takeoff belt tensioner pivot mount 115.10, drive takeoff belt tensioner arm 115.11, drive takeoff belt tensioner spring 115.12, and belt tensioner idler pulley 115.13 cooperate to provide means to offer a sufficient predetermined tension on drive takeoff belt 115.9 given any effective diameter presented by the plurality of drive pulley segment 115.4. By the foregoing relationship of elements, power from the plurality of drive pulley segment 115.4 may be transmitted via drive takeoff belt 115.9, drive transfer belt 115.16, drive output pulley 115.19, rear wheel freewheel 110.4, and rear wheel 110.

The actuator components of the present invention are positioned between drive pulley outer ring side member 115.3 and drive pulley inner ring side member 115.6, and inside the plurality of drive pulley segment 115.4 and that consist of one of a drive actuator 115.28, one of a drive actuator lead screw 115.29, one of a drive actuator lead screw thrust block 115.30, one of a drive actuator lead screw follower 115.31, one of a drive actuator transmitter-receiver 115.32, two of a drive actuator battery 115.33, two of a drive actuator battery holder 115.34, and two of a drive actuator battery cover 115.35. The forgoing actuator components cooperate such to provide controlled rotation of drive pulley outer ring side member 115.3 relative to drive pulley inner ring side member 115.6.

Drive input pulley 115.1 has an inside diameter fixed to the outside diameter of drive pulley ring bearing, and is therefore free to rotate with respect to rear wheel axle 110.2. Drive input pulley 115.1 is rotationally engaged with drive pulley outer ring side member 115.3 and with drive belt 100. By the foregoing relationships of elements, a rotational force is transferred from front drive pulley 90 via drive belt 100, which is in turn transferred to drive input pulley 115.1 and drive pulley outer ring side member 115.3.

A drive housing 115.2 is shown. Drive housing 115.2 is comprised of two hollow approximately half disk forms;

each half disk form has means along the common straight abutting edges to interlock and to thereby mitigate against dirt or moisture intrusion from the exterior surface to the interior surface. The two half disks when so interlocked form a hollow disk having a through hole at the center point, and the arcuate surface is press-fit into a circular shaped notch formed into drive input pulley 115.1 on one side, and with a press-fit into a circular shaped notch formed into drive output pulley 115.19 on the opposed side. With the foregoing relationships of elements, a space is formed in the interior of drive housing 115.2 occupied by drive actuator 115 that is made generally protected from the intrusion of dirt and moisture. Drive housing 115.2 could be formed from a variety of materials, such as plastic, such to minimize weight, and could be made relatively transparent such to allow visual inspection of drive assembly 115.

FIG. 4A illustrates, in a side view, selected components of the drive assembly of a first embodiment of the continuously variable transmission positioned in a low drive ratio position. FIG. 4B illustrates, in a side view, selected components of the drive assembly of a first embodiment of the continuously variable transmission positioned in a high drive ratio position. The respective vertical side faces of the central shank portion of the plurality of drive pulley segment 115.4 is constrained between the respective vertical inner faces of drive pulley inner ring side member 115.6 and drive pulley outer ring side member 115.3, and front pulley segment 115.4 has an elongated bearing pin projection on a first vertical face that is slidingly engaged with a respective straight slot guideway formed into drive pulley outer ring side member 115.3, and the opposed vertical side face is formed with a bearing round pin projection that slidingly engaged with a respective arcuate slot guideway formed into drive pulley inner ring side member 115.6. When drive pulley inner ring side member 115.6 is rotated with respect to drive pulley outer ring side member 115.3 the aforementioned constraints on the plurality of drive pulley segment 115.4 in conjunction with the geometric relationship of the respective straight slots and respective arcuate slots formed into drive pulley outer ring side member 115.3 and drive pulley inner ring side member 115.6, will cause the radial displacement of the plurality of drive pulley segment 115.4 such to present varied effective diameters. A larger effective diameter is shown in FIG. 4A, and a smaller effective diameter is shown in FIG. 4B.

Drive actuator transmitter-receiver 115.32 is fixed to the interior vertical face of drive pulley outer ring side member 115.3. Drive actuator transmitter-receiver 115.32 incorporates means to send and receive wireless data signals from and to computer 33 and to send and receive wired data signals from and to drive actuator 115.28. Drive actuator 115.28 is pivotally connected to the vertical interior face of drive pulley outer ring side member 115.3. Drive actuator lead screw 115.29 is rotationally engaged to the rotational output shaft incorporated into drive actuator 115.28, and is pivotally connected with one of a lead screw thrust block 115.30, and threadingly engaged with one of a drive actuator lead screw follower 115.31. The two drive actuator battery holders 115.34 are fixed to the interior vertical face of drive pulley outer ring side member 115.3. Drive actuator battery holder 115.34 provides means to mechanically hold a respective actuator battery 115.33 in position and to effect electrical current transfer from each drive actuator battery 115.33 to drive actuator 115.28 and drive actuator transmitter-receiver 115.32. Two holes are formed in drive pulley outer ring side member 115.3; each hole is aligned with a respective receptacle formed into drive actuator battery holder 115.34 to provide means to place and remove each drive actuator battery 115.33. Two actuator battery covers 115.35 are positioned in a respective hole formed in drive pulley outer ring side member 115.3 and provide means to resist intrusion of dirt and moisture into the space occupied by drive assembly 115. When drive lead screw 115.29 is rotated by drive actuator 115.28, drive actuator lead screw follower 115.31 is caused to present a changed linear dimension between the pivot connection of drive actuator 115.28 to drive pulley outer ring side member 115.3 and the pivotal connection of drive actuator lead screw follower 115.31 to drive pulley inner ring side member 115.6; this change in dimension produces a change in rotational position between drive pulley outer ring side member 115.3, and drive pulley inner ring side member 115.6, and results in a change in the effective diameter of the plurality of drive pulley segment 115.4.

Users of bicycles with derailleur drives are habituated to decrease torque input during gear changes, and therefore the need for a user to similarly decrease torque input during gear changes using the present invention should not necessitate a new technique to be learned and practiced by the user. In the present embodiment of the invention, a force will be exerted by the plurality of drive pulley segments 115.4 to the drive pulley inner ring side member 115.6 and drive pulley outer ring side member 115.3 which in turn will produce an axial force on drive actuator lead screw 115.29 and drive actuator lead screw follower 115.31. Such axial force is resisted by one of a drive actuator lead screw thrust block 115.30. The tendency for the drive actuator lead screw 115.29 and drive actuator lead screw follower 115.31 to be compressed and thereby shortened in overall combined length is resisted by the angle of interlocking threads formed into actuator lead screw 115.29 and drive actuator lead screw follower 115.31, in conjunction with the torque and gear reduction means incorporated into drive actuator 115.28. However, in the event a greater assurance is desired that the input torque will not exceed the resistive torque capacity of drive actuator 115.28 during a gear change operation, a mechanical or electromechanical clutch, ratchet, or other selectively releasable locking means may be placed between drive input pulley and 115.1 and drive pulley outer ring side member 115.3 such to limit torque transfer between the respective elements.

According to the preceding description, in the first preferred embodiment of the present invention, the primary components of the continuously variable transmission, and particularly drive assembly 115, are mounted with respect to the rear driving wheel of a bicycle. Due to the fact that drive assembly 115 is placed in a concentric relation to rear wheel axle 110.2 and drive output pulley 115.19 it is necessary to transfer rotational energy from drive takeoff belt 115.9 to drive transfer belt 115.16, and finally to drive output pulley 115.19.

FIG. 5 illustrates, in a side view, selected components of the drive assembly of a second embodiment of the continuously variable transmission positioned in a low drive ratio position. In the second preferred embodiment of the continuously variable transmission drive assembly 115 not placed in a concentric relation to drive output pulley 115.19; instead, drive assembly 115 and drive output pulley 115.19 have separate and spaced apart axes of rotation. In the present embodiment, drive assembly 115 is positioned concentrically and is rotationally engaged with a power input. The output from drive assembly 115 is taken from drive takeoff belt 115.9 rotationally engaged with the plurality of drive pulley segment 115.4 and drive output pulley 115.19.

In such configuration, the plurality of drive pulley segment 115.4 and drive output pulley 115.19 would not share a common axis of rotation. As will be evident to those skilled in the art, the configuration of the second preferred embodiment may be found as the more fitting mechanical configuration in some applications of the continuously variable transmission. One such advantage is that certain elements contained in the first preferred embodiment involved with transferring rotational energy off the axis of drive assembly 115 are not required, such as drive input pulley 115.1, drive transfer belt arm 115.15, drive transfer belt 115.16, drive transfer belt idler pulley 115.17, and drive transfer belt transfer pulley 115.18.

In the present second preferred embodiment an alternate means of effecting the rotation of drive pulley inner ring side member 115.6 relative to drive pulley outer ring side member 115.3 is shown. One of a pinion gear 112.2 is rotationally engaged to the output shaft of drive actuator 115.28. Drive actuator 115.28 is fixed to drive pulley outer ring side member 115.3. Pinion gear 112.2 is engaged with an arcuate gear strip formed into drive pulley inner ring side member 115.6.

FIG. 6 illustrates, in a detail isometric view, a first embodiment of selected drive components of the continuously variable transmission. For the purposes of the present illustration, a portion of drive takeoff belt 115.9 is shown, one front pulley segment carriage 115.4, and one drive pulley gripper 115.5. The bottom surface of drive takeoff belt 115.9 contacts the upper curved surface formed longitudinally in drive pulley segment 115.4. The canted side surfaces of drive takeoff belt 115.9 are set in close proximity to the side canted surfaces formed longitudinally in drive pulley segment 115.4. Drive pulley gripper 115.5 is formed as a cam with an axle protrusion. The axle protrusion formed into drive pulley gripper 115.5 is pivotally connected to a respective hole formed in drive pulley segment 115.4. When the rider is changing gears, and the effective diameter of the plurality of front pulley segment carriage 115.4 are undergoing a change in effective diameter, drive pulley gripper 115.5 is retracted such to allow drive takeoff belt 115.9 and drive pulley segment 115.4 to slide longitudinally with respect to each other. When a rotational force is applied to the continuously variable transmission, drive pulley gripper 115.5 rotates about the incorporated axle, thereby applying a clamping frictional force on the on the side surface of drive takeoff belt 115.9. Due to the relative resilience of the material comprising drive takeoff belt 115.9, the transfer of force between drive pulley segment 115.4 and drive takeoff belt 115.9 may be considered to be partially accomplished by friction, and partially accomplished by a mechanical interlock as a result of the relative deformation of the drive takeoff belt 115.9 due to the compressive force exerted by drive pulley gripper 115.5. It should be noted that the use of a belt gripping device of this type does not require a predetermined interval for the grip to be applied to the belt, such as would be produced using a synchronous or timing type belt containing notches, which would limit the selectable ratios in the continuously variable ratio transmission. A variation on the first embodiment of selected drive components of the continuously variable transmission is possible whereby two pulley grippers 115.5 are paired on opposed sides of drive takeoff belt 115.9. It should be noted that the use of a belt gripping device of this type does not require a predetermined interval for the grip to be applied to the belt, such as would be produced using a synchronous or timing type belt containing notches, which would limit the selectable ratios in the continuously variable ratio transmission.

FIG. 7 illustrates, in a detail isometric view, a second embodiment of selected drive components of the continuously variable transmission. For the purposes of the present illustration, a portion of drive takeoff belt 115.9 is shown, one front pulley segment carriage 115.4, and one drive pulley gripper 115.5. The bottom surface of drive takeoff belt 115.9 contacts the upper curved surface formed longitudinally in drive pulley segment 115.4. The canted side surfaces of drive takeoff belt 115.9 are set in close proximity to the side canted surfaces formed longitudinally in drive pulley segment 115.4. Drive pulley gripper 115.5 is formed as a cam with an axle protrusion. The axle protrusion formed into drive pulley gripper 115.5 is pivotally connected to a respective hole formed in drive pulley segment 115.4. When the rider is changing gears, and the effective diameter of the plurality of front pulley segment carriage 115.4 are undergoing a change in effective diameter, drive pulley gripper 115.5 is retracted such to allow drive takeoff belt 115.9 and drive pulley segment 115.4 to slide longitudinally with respect to each other. When a rotational force is applied to the continuously variable transmission, drive pulley gripper 115.5 rotates about the incorporated axle, thereby applying a clamping frictional force on the on the side surface of drive takeoff belt 115.9. Due to the relative resilience of the material comprising drive takeoff belt 115.9, the transfer of force between drive pulley segment 115.4 and drive takeoff belt 115.9 may be considered to be partially accomplished by friction, and partially accomplished by a mechanical interlock as a result of the toothed profile formed into the side of drive takeoff belt 115.9 engaged with a tooth profile formed into drive pulley gripper 115.5. It should be noted that the use of a belt gripping device of this type requires a predetermined interval for the grip to be applied to the belt. A variation on the current embodiment of the second embodiment of the continuously variable transmission is possible whereby two pulley grippers 115.5 are paired on opposed sides of drive takeoff belt 115.9.

Those skilled in the art may note that other gripper mechanisms could be employed to serve a similar function as that accomplished by drive pulley gripper 115.5 that would provide means to transmit torque using friction, as provided by selecting high friction materials for the contacting elements, or by applying high friction coatings, or by a semi-mechanical interlock via the deformation of the belt, or a combination of the two, between drive takeoff belt 115.9 and the plurality of drive pulley segment 115.4. It is also possible to allow torque to be transmitted between drive takeoff belt 115.9 and drive pulley segment 115.4 by means of forming toothed or roughened profiles of relatively small scale into drive takeoff belt 115.9 or drive pulley segment 115.4, or into both drive takeoff belt 115.9 and drive pulley segment 115.4 on selected contacting surfaces such to effectuate a selectively detachable mechanical interlock between drive takeoff belt 115.9 and drive pulley segment 115.4. It is further possible to substitute a chain for drive takeoff belt 115.9; in such an instance, in order to provide the smallest steps between available ratios, the chain could have a relatively small-increment toothed profile formed into its sides or top surfaces, such to engage with mating profiles formed into the contacting surfaces of drive pulley segment 115.4.

FIG. 8 schematically illustrates, in a diagram view, the interconnection of electrical drive power, communication, and control components of a first embodiment of the continuously variable transmission.

A gear change in the continuously variable transmission is accomplished with the following sequence: (a) the rider provides an input, such as by pushing a button incorporated into gear shifter 34. Gear shifter 34 incorporates means to send a wired data control signal to computer 33, (b) computer 33 incorporates means to receive the data control signal from gear shifter 34, and means to process the signal and send a wireless command data control signal to drive actuator transmitter-receiver 115.32, (c) drive actuator transmitter-receiver 115.32 sends a wired command data control signal to drive actuator 115.28, (d) drive actuator lead screw 115.29, threadingly engaged with drive actuator lead screw follower 115.31, rotates such to effect a rotational position displacement of drive pulley inner ring side member 115.6 with respect to drive pulley outer ring side member 115.3, (e) the new rotational position data control signal is relayed via a wired connection from drive actuator 115.28 to drive actuator transmitter-receiver 115.32, which in turn sends a wireless data control signal to computer 33, and (h) computer 33 records the confirmed rotation position data. By means of the forgoing interrelationships of components, a closed loop control system is incorporated into the continuously variable transmission such to control the variable effective output diameter of the plurality of drive pulley segment 115.4 incorporated into drive assembly 115. A wired power link is provided from drive actuator battery 115.33 to drive actuator 115.28 and to drive actuator transmitter-receiver 115.32. Computer 33 has means to effect a 2-way wireless data link to an external device. It will be noted by those of ordinary skill in the art that gear shifter 34 could be incorporated into computer 33, and if not so incorporated, gear shifter 34 could communicate with computer 33 via a wireless 2-way data link.

Accordingly, it may be seen that a continuously variable transmission of the present invention incorporates control functions to properly pair input speed and torque with output speed and torque by selecting appropriate input-output drive ratios. The present invention may be easily placed on a variety of human powered vehicles, and may easily be retrofitted onto an existing vehicle, such as a bicycle. In addition, the continuously variable transmission may interface easily with common bicycle components, such as pedals, cranks, wheels, and frames. The present invention may also be adapted for use with other mechanisms that benefit from the use of a continuously variable transmission.

The continuously variable transmission may be made from a variety of materials, including lightweight metals and composites, and may therefore provide a strong and lightweight drive suitable for a variety of human powered and lightweight vehicle types or machine devices. The present invention may also be configured to have additional strength and capacity to transmit higher speed, torque, and power forces, such as may be found necessary in other devices.

The continuously variable transmission provides means to provide a wide variety of drive ratios. The cooperation of the mechanical components allows closely spaced steps to be selected between the lowest and highest gear ratio. The incorporated electronic controls provide one or more combinations of ratios to be stored and used as may be appropriate for anticipated use conditions. Because the steps between gear ratios are always in single direction—that is either progressively higher or lower—the selection of an appropriate gear ratio is made simple and intuitive.

As has been noted in the preceding description, the first preferred embodiment of the continuously variable transmission is described as employing an actuator having a rotational output lead screw and lead screw follower as the principal actuator components, and the second preferred embodiment of the continuously variable transmission is described as employing an actuator having a rotational output pinion gear and arcuate gear strip as the principal actuator components. As is known to those having ordinary skill in the art, other types of actuators could be used to fulfill this same function, such as linear motors, piezoelectric linear motors, rotational motors coupled to other gear trains, or electrically controlled hydraulic or pneumatic systems. For example, a linear motor or actuator could be pivotally connected to drive pulley outer ring side member 115.3 on one terminal end, and pivotally connected to drive pulley inner ring side member 115.6 on the second terminal end, and thereby effect an angular displacement of drive pulley outer ring side member 115.3 relative to drive pulley inner ring side member 115.6 about the axis of rotation so as to cause a coordinated change in a radial displacement of the plurality of drive pulley segment carriage 115.4.

The first preferred embodiment of the present invention has been described as allowing use of either a chain drive or belt drive system to transmit power from front drive pulley 90 to drive input pulley 115.1. In similar fashion, a chain drive system could be used in lieu of the belt drive system described above for transmitting power from the plurality of drive segment pulley carriage 115.4 to drive transfer belt transfer pulley 115.18, and for transmitting power from drive transfer belt transfer pulley 115.18 to drive output pulley 115.19.

The continuously variable transmission maintains continuous linkage between the principle driving elements, and therefore presents substantial safety advantages over typical derailleur drive systems which shift the drive chain from one sprocket to another, and that may therefore jam or decouple the chain from the drive.

By providing an onboard computer, the continuously variable transmission is able to control the function of the drive system, and can also extend the data that may be accumulated during its operation. For example, in the case where the present invention is incorporated in a human powered vehicle, the computer may log and wirelessly communicate the shift points in a ride, and correlate this information with other information, such as velocity, inclination, altitude, geographic position, and heart rate.

The continuously variable transmission is presently depicted as part of a bicycle drivetrain; however, the present invention may be sized appropriately such to be utilized in any number of vehicle or machine types in which a transmission capable of closely spaced ratios is desired. The primary elements of the first preferred embodiment of present invention, comprised principally of drive assembly 115, could be positioned in other ways than is shown in the description above. For example, in a variation of the first preferred embodiment of the present invention, as described in the second preferred embodiment of the present invention, the power input could be made directly to drive pulley outer ring side member 115.3, and drive takeoff belt 115.9 could be rotationally linked directly to the power output via a belt, chain, or other power transfer means. In such configuration a belt or chain tensioning means similar to that shown in the description above could be employed, or other belt or chain tensioning devices as known in the art could be employed.

Further embodiments of the present invention could employ additional components than those cited above. For example, a relatively small generator may be added to the drive system such to provide a charging means for drive actuator battery 115.33, or, to provide regenerative charging in the case of an application of the present invention to an electrically powered vehicle. In addition, an electromechanical clutch means might be added between drive input pulley 115.1 and drive pulley outer ring side member 115.3. Such additional components may be added to the present electrical and control system using power and control means known in the art.

The continuously variable transmission provides means to produce infinitesimal steps between ratios. In the instance of the application of the present invention to a human powered vehicle, it will be noted that as a practical matter, many users will prefer to define discrete steps between ratios. The particular steps selected may depend on a variety of factors including the expected terrain and rider strength. Computer 33 has means to store rider preferences for drive ratios, and save these in various "sets". For example, one ratio set might be comprised of closely spaced and relatively high ratios that might be appropriate for low-slope terrain, and a second ratio set might be comprised of relatively wider spaced and relatively low ratios that might be appropriate for terrain that includes both flat and hilly sections. Computer 33 in addition can be made to provide means to record a variety of information from drive assembly 115, such as the selection of a gear ratio at a given time, and from other external sources concerning a given ride, which could track data concerning, for example, weather, altitude, slope inclination, rider heart rate, peddling rate, and velocity; and furthermore could both store and wirelessly transmit such data to external devices. Such capability may be found beneficial by a rider training over a given course wishing to monitor performance progress, or by a competitive bicycle team to monitor individual and team performance during a race event. In another instance of the application of the continuously variable transmission to a mechanically powered vehicle, the smooth transition afforded between the infinitesimal ratios would likely be employed to maximize efficiency over varied slope and speed conditions.

Although the description above contains many specificities, these should not be construed as limiting the scope of the invention but merely as illustrating some example embodiments of the invention. It will be understood by those of skill in the art that the various components can have other shapes and sizes, material composition, include particular numbers of elements, and be assembled in a variety of sequences, etc., without departing from the spirit and scope of the invention as defined by the appended claims and their equivalents.

INDUSTRIAL APPLICABILITY

A variable diameter pulley and/or an apparatus employing a continuously variable transmission including a variable diameter pulley assembly can be applied to a wide variety of powered devices including devices using human power input or mechanical input.

REFERENCE SIGNS LIST

The following is a list of parts of the example embodiments of the present invention depicted in the appended drawings and described above:
10 Frame
10.1 Frame Dropout
11 Front Brake
12 Rear Brake
20 Seat Post
21 Seat
30 Bar Stem
31 Handlebar
32 Brake Lever
33 Computer
34 Gear Shifter
40 Fork
50 Front Wheel
70 Crank
80 Pedal
90 Front Drive Pulley
100 Drive Belt
110 Rear Wheel
110.1 Rear Wheel Hub
110.2 Rear Wheel Axle
110.3 Rear Wheel Skewer
110.4 Rear Wheel Freewheel
110.5 Rear Wheel Axle Nut
112.2 Pinion Gear
112.3 Arcuate Gear Strip
112.6 Dirt Seal
115 Drive Assembly
115.1 Drive Input Pulley
115.2 Drive Housing
115.3 Drive Pulley Outer Ring Side Member
115.3.1 Straight Guideway
115.4 Drive Pulley Segment
115.4.1 Drive Pulley Segment Sidewall
115.4.2 Drive Pulley Segment Bearing Portion
115.5 Drive Pulley Cam
115.6 Drive Pulley Inner Ring Side Member
115.6.1 Arcuate Guideway
115.7 Drive Pulley Ring Isolation Bearing
115.8 Drive Pulley Ring Bearing
115.9 Drive Takeoff Belt
115.10 Drive Takeoff Belt Tensioner Pivot Mount
115.11 Drive Takeoff Belt Tensioner Arm
115.12 Drive Takeoff Belt Tensioner Spring
115.13 Belt Tensioner Idler Pulley
115.15 Drive Transfer Belt Arm
115.16 Drive Transfer Belt
115.17 Drive Transfer Belt Idler Pulley
115.18 Drive Transfer Belt Transfer Pulley
115.19 Drive Output Pulley
115.28 Drive Actuator
115.29 Drive Actuator Lead Screw
115.30 Drive Actuator Lead Screw Thrust Block
115.31 Drive Actuator Lead Screw Follower
115.32 Drive Actuator Transmitter-Receiver
115.33 Drive Actuator Battery
115.34 Drive Actuator Battery Holder
115.35 Drive Actuator Battery Cover

The invention claimed is:

1. A variable diameter pulley assembly comprising:
an axle defining an axis of rotation;
a first side member coupled to rotate with the axle and formed with a plurality of first guideways;
a second side member spatially separated from the first side member, coupled to rotate freely about the axle, and formed with a plurality of second guideways respectively corresponding to the first guideways of the first side member at a plurality of intersections arranged in a circle about the axis of rotation;
a plurality of pulley segments configured to engage with a belt for transferring rotary power to or from the variable diameter pulley assembly, the pulley segments coupled with the first and second guideways at the intersections so as to be arranged in the circle about the axis of rotation, the circle defining an effective diameter of the variable diameter pulley assembly; and electro-mechanical actuator means for changing an angular displacement of the first side member relative to the second side member about the axis of rotation in response to a user input, so as to cause a coordinated change in a radial displacement of the pulley segments coupled with the first and second guideways at the intersections arranged in the circle defining the effective diameter of the variable diameter pulley assembly, and thereby changing the effective diameter of the variable diameter pulley assembly, wherein the electro-mechanical actuator means comprises:

a power source;

an actuator pivotally connected to the first side member, powered by the power source, and configured to rotate an actuator lead screw in response to a control signal;

an actuator lead screw follower pivotally connected to the second side member and threadingly engaged with the actuator lead screw;

control means configured to generate the control signal and supply the control signal to the actuator in response to the user input, and wherein rotation of the actuator lead screw by the actuator in response to the control signal causes a change in displacement between the actuator pivotally connected to the first side member and the actuator lead screw follower pivotally connected to the second side member that results in a change in the angular displacement of the first side member relative to the second side member.

2. A variable diameter pulley assembly comprising:

an axle defining an axis of rotation;

a first side member coupled to rotate with the axle and formed with a plurality of first guideways;

a second side member spatially separated from the first side member, coupled to rotate freely about the axle, and formed with a plurality of second guideways respectively corresponding to the first guideways of the first side member at a plurality of intersections arranged in a circle about the axis of rotation;

a plurality of pulley segments configured to engage with a belt for transferring rotary power to or from the variable diameter pulley assembly, the pulley segments coupled with the first and second guideways at the intersections so as to be arranged in the circle about the axis of rotation, the circle defining an effective diameter of the variable diameter pulley assembly; and electro-mechanical actuator means for changing an angular displacement of the first side member relative to the second side member about the axis of rotation in response to a user input, so as to cause a coordinated change in a radial displacement of the pulley segments coupled with the first and second guideways at the intersections arranged in the circle defining the effective diameter of the variable diameter pulley assembly, and thereby changing the effective diameter of the variable diameter pulley assembly, wherein the electro-mechanical actuator means comprises:

a power source;

an actuator fixedly connected to the first side member, powered by the power source, and configured to rotate an actuator pinion gear in response to a control signal;

an arcuate gear strip fixedly connected to the second side member and meshingly engaged with the actuator pinion gear;

control means configured to generate the control signal and supply the control signal to the actuator in response to the user input, wherein rotation of the actuator pinion gear by the actuator in response to the control signal applies a torque to the arcuate gear strip about the axis of rotation which causes a change in the angular displacement of the first side member relative to the second side member.

3. The variable diameter pulley assembly of one of claim 1 and claim 2, wherein the plurality of first guideways comprises arcuate guideways arranged in a multiple-arm spiral pattern, and the plurality of second guideways comprises straight guideways arranged in a radial pattern.

4. The variable diameter pulley assembly of one of claim 1 and claim 2, wherein at least one of the plurality of first guideways and the plurality of second guideways comprises guideways of at least one type belonging to the group consisting of grooves, slots, and tracks.

5. The variable diameter pulley assembly of one of claim 1 and claim 2, wherein each of the pulley segments comprises:

a central shank portion configured to engage with the belt for transferring rotary power to or from the variable diameter pulley assembly; and a pair of bearing portions extending longitudinally from opposite ends of the central shank portion and respectively coupled with a corresponding one of the first guideways and a corresponding one of the second guideways at a corresponding one of the intersections.

6. The variable diameter pulley assembly of claim 5, wherein the pair of bearing portions is formed with an elongated cross-section allowing the pulley segments to slide forward and backward along corresponding first and second guideways while preventing the pulley segments from rotating.

7. The variable diameter pulley assembly of one of claim 1 and claim 2, wherein the belt comprises notches formed in at least one side thereof at a predetermined interval, and the central shank portion of each of the pulley segments is configured to engage with the belt at positions along the belt corresponding to the notches formed at the predetermined interval for transferring rotary power to or from the variable diameter pulley assembly.

8. The variable diameter pulley assembly of one of claim 1 and claim 2, wherein the central shank portion of each of the pulley segments is configured to engage with the belt at any position along the belt for transferring rotary power to or from the variable diameter pulley assembly.

9. The variable diameter pulley assembly of claim 8, wherein the central shank portion of each of the pulley segments comprises:

a base contacting one side of the belt;

a pair of sidewalls preventing the belt from slipping sideways off of the base; and a cam member rotatably installed in at least one of the pair of sidewalls to contact at least one side of the belt, movement of the belt perpendicular to an axis of rotation of the cam member causing the cam member to rotate and apply a clamping force to the belt.

10. An apparatus comprising a rotary power source and a continuously variable transmission coupled to the rotary power source, the continuously variable transmission comprising a first pulley assembly, a second pulley assembly, and a belt coupled about the first pulley assembly and the second pulley assembly for transferring rotary power therebetween, the first pulley assembly being of a variable diameter type for adjusting a turning ratio relative to the second pulley assembly, the first pulley assembly comprising:
- a first axle defining a first axis of rotation;
- a first side member coupled to rotate with the first axle and formed with a plurality of first guideways;
- a second side member spatially separated from the first side member, coupled to rotate freely about the first axle, and formed with a plurality of second guideways respectively corresponding to the first guideways of the first side member at a plurality of intersections arranged in a circle about the first axis of rotation;
- a plurality of pulley segments configured to engage with the belt for transferring rotary power to or from the first pulley assembly, the pulley segments coupled with the first and second guideways at the intersections so as to be arranged in the circle about the first axis of rotation, the circle defining an effective diameter of the first pulley assembly;
- electro-mechanical actuator means for changing an angular displacement of the first side member relative to the second side member about the first axis of rotation so as to cause a coordinated change in a radial displacement of the pulley segments coupled with the first and second guideways at the intersections arranged in the circle defining the effective diameter of the first pulley assembly, and thereby changing the effective diameter of the first pulley assembly; and
- tensioner means for maintaining tension in the belt,
- wherein the electro-mechanical actuator means comprises:
- a power source;
- an actuator pivotally connected to the first side member, powered by the power source, and configured to rotate an actuator lead screw in response to a control signal;
- an actuator lead screw follower pivotally connected to the second side member and threadingly engaged with the actuator lead screw;
- control means configured to generate the control signal and supply the control signal to the actuator in response to the user input, and
- wherein rotation of the actuator lead screw by the actuator in response to the control signal causes a change in displacement between the actuator pivotally connected to the first side member and the actuator lead screw follower pivotally connected to the second side member that results in a change in the angular displacement of the first side member relative to the second side member.

11. An apparatus comprising a rotary power source and a continuously variable transmission coupled to the rotary power source, the continuously variable transmission comprising a first pulley assembly, a second pulley assembly, and a belt coupled about the first pulley assembly and the second pulley assembly for transferring rotary power therebetween, the first pulley assembly being of a variable diameter type for adjusting a turning ratio relative to the second pulley assembly, the first pulley assembly comprising:
- a first axle defining a first axis of rotation;
- a first side member coupled to rotate with the first axle and formed with a plurality of first guideways;
- a second side member spatially separated from the first side member, coupled to rotate freely about the first axle, and formed with a plurality of second guideways respectively corresponding to the first guideways of the first side member at a plurality of intersections arranged in a circle about the first axis of rotation;
- a plurality of pulley segments configured to engage with the belt for transferring rotary power to or from the first pulley assembly, the pulley segments coupled with the first and second guideways at the intersections so as to be arranged in the circle about the first axis of rotation, the circle defining an effective diameter of the first pulley assembly;
- electro-mechanical actuator means for changing an angular displacement of the first side member relative to the second side member about the first axis of rotation so as to cause a coordinated change in a radial displacement of the pulley segments coupled with the first and second guideways at the intersections arranged in the circle defining the effective diameter of the first pulley assembly, and thereby changing the effective diameter of the first pulley assembly; and
- tensioner means for maintaining tension in the belt,
- wherein the electro-mechanical actuator means comprises:
- a power source;
- an actuator fixedly connected to the first side member, powered by the power source, and configured to rotate an actuator pinion gear in response to a control signal;
- an arcuate gear strip fixedly connected to the second side member and meshingly engaged with the actuator pinion gear;
- control means configured to generate the control signal and supply the control signal to the actuator in response to the user input,
- wherein rotation of the actuator pinion gear by the actuator in response to the control signal applies a torque to the arcuate gear strip about the axis of rotation which causes a change in the angular displacement of the first side member relative to the second side member.

12. The apparatus of claim 10, wherein the first pulley assembly is directly coupled to the rotary power source to receive rotary power therefrom.

13. The apparatus of claim 10, wherein the second pulley assembly is directly coupled to the rotary power source to receive rotary power therefrom.

14. The apparatus of claim 10, wherein the first pulley assembly further comprises:
- an input pulley coupled to the first side member to rotate with the first axle and the first side member, the input pulley coupled to the rotary power source via the belt to receive rotary power therefrom.

15. The apparatus of claim 10, wherein the second pulley assembly comprises:
- a second axle defining a second axis of rotation; and
- an output pulley coupled to rotate with the second axle, the output pulley coupled to the first pulley assembly via the belt to receive rotary power therefrom.

16. The apparatus of claim 15, wherein the second axis of rotation coincides with the first axis of rotation, and the second pulley assembly further comprises:
- a double-wheel pulley disposed off of the first axis of rotation and having first and second wheels arranged side-by-side to rotate together, the first wheel coupled to the first pulley assembly via the belt to receive rotary power therefrom, and the second wheel coupled to the output pulley via the belt to transfer rotary power thereto;
- an idler pulley disposed off of the first axis of rotation, separated by predetermined distance from the first wheel of the double-wheel pulley, and coupled to the first wheel of the double-wheel pulley and the first pulley assembly by the belt so as to widen a loop made by the belt; and a support member supporting the double-wheel pulley and the idler pulley.

17. The apparatus of one of claim 10 and claim 11, wherein the plurality of first guideways comprises arcuate guideways arranged in a multiple-arm spiral pattern, and the plurality of second guideways comprises straight guideways arranged in a radial pattern.

18. The apparatus of claim 10, wherein at least one of the plurality of first guideways and the plurality of second guideways comprises guideways of at least one type belonging to the group consisting of grooves, slots, and tracks.

19. The apparatus of claim 10, wherein each of the pulley segments comprises:

a central shank portion configured to engage with the belt for transferring rotary power to or from the first pulley assembly; and a pair of bearing portions extending longitudinally from opposite ends of the central shank portion and respectively coupled with a corresponding one of the first guideways and a corresponding one of the second guideways at a corresponding one of the intersections.

20. The apparatus of claim 19, wherein the pair of bearing portions is formed with an elongated cross-section allowing the pulley segments to slide forward and backward along corresponding first and second guideways while preventing the pulley segments from rotating.

21. The apparatus of claim 19, wherein the belt comprises notches formed in at least one side thereof at a predetermined interval, and the central shank portion of each of the pulley segments is configured to engage with the belt at positions along the belt corresponding to the notches formed at the predetermined interval for transferring rotary power to or from the first pulley assembly.

22. The apparatus of claim 19, wherein the central shank portion of each of the pulley segments is configured to engage with the belt at any position along the belt for transferring rotary power to or from the first pulley assembly.

23. The apparatus of claim 22, wherein the central shank portion of each of the pulley segments comprises:

a base contacting one side of the belt;

a pair of sidewalls preventing the belt from slipping sideways off of the base; and a cam member rotatably installed in at least one of the pair of sidewalls to contact at least one side of the belt, movement of the belt perpendicular to an axis of rotation of the cam member causing the cam member to rotate and apply a clamping force to the belt.

24. The apparatus of either one of claims 10 and 11, wherein the control means comprises:

a computer configured to generate the control signal and supply the control signal to the actuator in response to the user input; and an interface configured to receive the user input and provide the user input to the computer.

25. The apparatus of either one of claims 10 and 11, wherein the control means comprises:

a wireless transceiver configured to receive the control signal and supply the control signal to the actuator;

a computer configured to generate the control signal and wirelessly transmit the control signal to the transceiver in response to the user input; and an interface configured to receive the user input and provide the user input to the computer.

26. The apparatus of claim either one of claims 10 and 11, wherein the control means comprises:

a computer configured to generate the control signal and supply the control signal to the actuator in response to the user input;

an interface configured to receive the user input and provide the user input to the computer; and sensor means configured to sense a state of the actuator means and supply the sensed state to the computer as feedback.

27. The apparatus of claim 26, wherein the computer is configured to wirelessly transmit information including the state of the actuator means received from the sensor means to an external device.

28. The apparatus of claim 10, wherein the tensioner means comprises:

a tensioner idler pulley coupled to rotate about a third axis of rotation, the tensioner idler pulley coupled to the first pulley assembly and the second pulley assembly by the belt to rotate therewith;

a tensioner support member pivotally installed about one of the first axis and the second axis and supporting the tensioner idler pulley; and a tensioner spring applying a rotational bias to the tensioner support member so that the tensioner idler pulley applies a force to the belt in a transverse direction thereof, so as to keep the endless power transfer element in tension.

29. The apparatus of claim 10, further comprising:

a housing configured to protect at least one of the first pulley assembly and the second pulley assembly within a water and dirt resistant enclosure.

30. The apparatus of claim 10, wherein the apparatus is employed as a drive mechanism of a human-powered vehicle.

31. The apparatus of claim 30, wherein the human-powered vehicle is a bicycle and the apparatus is fitted onto an existing bicycle frame.

* * * * *